(12) United States Patent
Yang et al.

(10) Patent No.: US 7,901,824 B2
(45) Date of Patent: Mar. 8, 2011

(54) COLORANT TREATED ION EXCHANGE RESINS, METHOD OF MAKING, HEAT TRANSFER SYSTEMS AND ASSEMBLIES CONTAINING THE SAME, AND METHOD OF USE

(75) Inventors: Bo Yang, Ridgefield, CT (US); Peter Woyciesjes, Woodbury, CT (US); Aleksei V. Gershun, Southbury, CT (US); Filipe Marinho, Danbury, CT (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 12/571,943

(22) Filed: Oct. 1, 2009

(65) Prior Publication Data

US 2010/0092823 A1 Apr. 15, 2010

Related U.S. Application Data

(62) Division of application No. 11/222,506, filed on Sep. 8, 2005, now Pat. No. 7,611,787.

(60) Provisional application No. 60/607,969, filed on Sep. 8, 2004.

(51) Int. Cl.
*H01M 8/04* (2006.01)
*H01M 8/12* (2006.01)

(52) U.S. Cl. ............... 429/437; 8/647; 428/32.52; 428/221

(58) Field of Classification Search .............. 429/26, 429/13
See application file for complete search history.

(56) References Cited

U.S. PATENT DOCUMENTS

| | | | |
|---|---|---|---|
| 3,216,948 A | 11/1965 | Redding | |
| 3,507,702 A | 4/1970 | Sanderson | |
| 3,960,740 A | 6/1976 | Truett | |
| 3,964,930 A | 6/1976 | Reiser | |
| 4,284,729 A | 8/1981 | Cross et al. | |
| 4,402,847 A | 9/1983 | Wilson et al. | |
| 4,514,427 A | 4/1985 | Mitchell et al. | |

(Continued)

FOREIGN PATENT DOCUMENTS

CA 2344856 3/2000

(Continued)

OTHER PUBLICATIONS

STIC Search.*

(Continued)

*Primary Examiner* — Ula C Ruddock
*Assistant Examiner* — Stephen Yanchuk
(74) *Attorney, Agent, or Firm* — Cantor Colburn LLP

(57) ABSTRACT

Disclosed is a colorant treated ion exchange resin comprising at least 15% of exchangeable groups comprising at least one of an ion, a Lewis acid, or a Lewis base resulting from a colorant having a $pK_a$ or $pK_b$ of greater than 5 in an aqueous solution at 25° C., based on the total number of exchangeable groups. Also disclosed are heat transfer systems, assemblies, fuel cell systems and methods of maintaining a conductivity of less than 200 μS/cm in a heat transfer fluid that employ the disclosed colorant treated ion exchange resins. Finally, a method of making the disclosed colorant treated ion exchange resins is provided.

20 Claims, 2 Drawing Sheets

U.S. PATENT DOCUMENTS

| | | | |
|---|---|---|---|
| 4,584,125 | A | 4/1986 | Griswold et al. |
| 4,648,883 | A | 3/1987 | Podder |
| 5,200,278 | A | 4/1993 | Watkins et al. |
| 5,723,060 | A | 3/1998 | Bruhnke et al. |
| 5,725,794 | A | 3/1998 | Bruhnke et al. |
| 5,776,624 | A | 7/1998 | Neutzler |
| 6,486,248 | B2 | 11/2002 | Ashley et al. |
| 6,528,564 | B1 | 3/2003 | Xia |
| 6,605,126 | B1 * | 8/2003 | Xia et al. ............... 8/647 |
| 6,663,993 | B2 | 12/2003 | Imaseki et al. |
| 6,673,482 | B2 | 1/2004 | Imazeki et al. |
| 6,709,779 | B2 | 3/2004 | Uozumi |
| 2001/0050191 | A1 | 12/2001 | Ogawa et al. |
| 2002/0031693 | A1 | 3/2002 | Ishikawa |
| 2002/0063088 | A1 | 5/2002 | Hidaka et al. |
| 2002/0076591 | A1 | 6/2002 | Imaseki et al. |
| 2003/0072981 | A1 | 4/2003 | Imaseki et al. |
| 2004/0001984 | A1 | 1/2004 | Alva |
| 2004/0028963 | A1 | 2/2004 | Kormann et al. |
| 2004/0028971 | A1 | 2/2004 | Wenderoth et al. |
| 2004/0086757 | A1 * | 5/2004 | Mohapatra ............... 429/26 |
| 2004/0110050 | A1 | 6/2004 | Elhamid et al. |
| 2004/0129920 | A1 | 7/2004 | Wenderoth et al. |
| 2004/0245493 | A1 * | 12/2004 | Abe et al. ............... 252/71 |

FOREIGN PATENT DOCUMENTS

| | | | |
|---|---|---|---|
| CA | 2430443 | | 7/2002 |
| CA | 2435593 | | 8/2002 |
| CA | 2445792 | A1 | 11/2002 |
| CA | 2449208 | A1 | 12/2002 |
| EP | 0376126 | | 7/1990 |
| EP | 1262535 | A1 | 12/2002 |
| EP | 1323677 | | 2/2003 |
| EP | 1304367 | A1 | 4/2003 |
| EP | 1416563 | A1 | 5/2004 |
| EP | 1457542 | A2 | 9/2004 |
| HU | 209546 | | 7/1994 |
| JP | 8184877 | | 7/1996 |
| WO | 0017951 | | 3/2000 |
| WO | 0175999 | | 10/2001 |
| WO | 02055630 | A1 | 7/2002 |
| WO | 02055759 | A2 | 7/2002 |
| WO | 02090462 | A1 | 11/2002 |
| WO | 02101848 | A2 | 12/2002 |
| WO | 02101848 | A3 | 12/2002 |
| WO | 03033616 | A1 | 4/2003 |
| WO | 03061044 | A2 | 7/2003 |
| WO | 03061044 | A3 | 7/2003 |
| WO | 03070854 | A1 | 8/2003 |
| WO | 2004053015 | | 6/2004 |
| WO | 2004053015 | A1 | 6/2004 |

OTHER PUBLICATIONS

"Amberlyst Weak Base Anions", Internet Article, URL: http://web.archive.org/web/20040623050423/http://www.rohmhaas.com/ionexchange/IP/wba.htm, Jun. 23, 2004.

"Physical Sciences Information Gateway—Chemical Data Tablesy", Internet Article, URL: http://web.archive.org/web/2004305150910/http://www.psigate.ac.uk/newsite/reference/chemdata/12.html, Mar. 5, 2004.

International Search Report dated Dec. 28, 2005 for PCT/US2005/032173, International Filing Date Sep. 8, 2005.

International Search Report dated Dec. 28, 2005 for PCT/US2005/031778, International Filing Date Sep. 8, 2005.

International Search Report dated Jan. 22, 2007 for International Application No. PCT/US2005/031834, International Filing Date Sep. 8, 2005.

Written Opinion of the International Search Report dated Jan. 22, 2007 for International Application No. PCT/US2005/031834, International Filing Date Sep. 8, 2005.

Dr. F. T. Lande, Dr. C. Schmidt and Dr. H. J. Brauch, Emerging Contaminants for Drinking Water Supplies, Perfluoroalkylcarboxylates and -sulfonates, Jun. 2006, www.riwa.org/e)_publikaties/137_ptfe_report.pdf, 29 pages.

International Search report for PCT/US20051032174 dated Jul. 17, 2006, 3 pages.

Written Opinion for PCT/US2005/032174 dated Jul. 17, 2006, 16 pages.

Written Opinion for PCT/US2005/032173 dated Dec. 28, 2005, 5 pages.

Written Opinion for PCT/US2005/031778, dated Dec. 29, 2005, 9 pages.

Educ. Reso for Part. techn. 032Q-Nelson, Dispersing Powders in Liquids, Part 3, Copyright 2003 Ralph Nelson, Licensed to ERPT, pp. 4: 1-12.

* cited by examiner

COLORANT TREATED ION EXCHANGE RESINS, METHOD OF MAKING, HEAT TRANSFER SYSTEMS AND ASSEMBLIES CONTAINING THE SAME, AND METHOD OF USE

The application is a divisional application of U.S. Ser. No. 11/222,506, filed Sep. 8, 2005, which also claims the benefit of U.S. Provisional Application Ser. No. 60/607,969, filed on Sep. 8, 2004, the contents each of which are incorporated herein by reference thereto.

FIELD OF THE INVENTION

The invention relates to colorant pre-treated ion exchange resins and their use in heat transfer systems, alternative power sources such as fuel cells, and assemblies comprising such power sources.

BACKGROUND OF THE INVENTION

Heat transfer systems in thermal communication with a power source have been utilized to regulate heat generated during the operation of the power source. For example, automotive vehicles have employed heat transfer fluids and heat transfer systems that transfer and dissipate heat generated as a by-product of gasoline powered internal combustion engines. In this case, the heat transfer fluids and heat transfer systems ensure that the engine operates in an optimum environment and is not subject to undesirably high temperatures.

However, alternatives to traditional gasoline powered internal combustion engine are now desired, especially alternatives that address public concerns regarding the environmental and the management of natural resources. As a result, new power source technologies continue to be developed, especially those that provide improvements in energy efficiency. Examples of alternative power sources that have been developed include, but are not limited to, batteries, fuel cells, solar (photovoltaic) cells, and internal combustion engines powered by the condensation of steam, natural gas, diesel, hydrogen, and/or the like. Such alternative power sources may be used alone or in combinations thereof, such as those employed in hybrid vehicles.

Although such alternative power sources often provide improvements in energy efficiency as compared to gasoline powered internal combustion engines, they continue to require the use of heat transfer systems and heat transfer fluids. In particular, heat transfer systems and fluids are necessary to maintain optimum operating conditions, particularly in regards to temperature.

Unfortunately, however, traditional prior art heat transfer systems and heat transfer fluids are unsuitable (or not optimized) for use with alternative power sources, especially those employing electricity or an electrical charge. For example, traditional prior art heat transfer fluids are typically characterized by extremely high conductivities, often in the range of 3000 μS/cm or more. The use of highly conductive heat transfer fluids with alternative power sources, especially electricity based alternative power sources, can result in electrical shock, increased corrosion and/or the short-circuiting of electrical current.

As a result, conventional heat transfer fluids are unsuitable for use with some alternative power sources; especially electricity based alternative power sources.

Fuel cells are a particularly attractive alternative power source because of their clean and efficient operation. Fuel cells have been proposed for use in numerous applications.

For example, it has been proposed that fuel cells replace the internal combustion engines currently used in automobiles. Several different kinds of fuel cells are currently under development and appear to hold promise for use in automotive applications. Illustrative examples include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

A fuel cell assembly typically comprises an anode, a cathode, and an electrolyte in between the two electrodes. Normally, an oxidation reaction (e.g., $H_2 \rightarrow 2H^+ + 2e$) takes place at the anode and a reduction reaction (e.g., $O_2 + 2H_2O + 4e \rightarrow 4OH^-$) takes place at the cathode. The electrochemical reactions that occur at the electrodes are exothermic, i.e., they produce heat.

The successful replacement of internal combustion engines with fuel cells requires that optimal operating conditions be achieved and maintained, i.e., a fuel cell must achieve the desirable current density level without degradation of fuel cell components. It is therefore necessary to control the exothermic heat produced during the electrochemical reactions.

For example, to achieve optimal operating conditions, the normal operating temperature of a PEM fuel cell assembly is controlled so that it remains within a range of from 60° C. to 95° C. Because of the exothermic nature of the electrochemical reactions, it is desirable to use a heat transfer fluid or heat transfer fluid to keep the electrode assembly at an operating temperature that is within the desired operating temperature range. However, the presence of an electrical charge makes it challenging to use fuel cells with prior art heat transfer systems and fluids.

Moreover, in order to produce sufficient power, a fuel cell based automotive engine might have many fuel cells connected together in series to form a fuel cell stack. Individual fuel cells may have an operating voltage of from 0.6 to 1.0V DC. In one instance, it is contemplated that anywhere from 100 to 600 individual fuel cells might be connected in series. As a result, the DC electrical voltage across automotive fuel cell stacks could be very high, typically ranging from 125 to 450 V DC.

These same voltages are experienced in the heat transfer fluid systems of the individual fuel cells used in automotive fuel cell stacks. To prevent or minimize electrical shock hazard, the heat transfer fluid must have very low conductivity. Low electrical conductivity for fuel cell heat transfer fluid is also desirable for the reduction of shunt current in the heat transfer fluid system and the minimization of system efficiency reduction.

There is therefore a need to provide 'low conductivity' heat transfer fluids intended for use in heat transfer systems that are in thermal communication with alternative power sources.

In addition to low electrical conductivity, heat transfer fluids used with alternative power sources must also have high heat capacity, low viscosity, and high thermal conductivity. Such properties help minimize pressure drops and reduce pumping power requirements while still meeting heat transfer requirements. Good surface wetting properties are also desirable in a heat transfer fluid employed with alternative power sources. A heat transfer fluid with good surface wetting characteristics is helpful in reducing pressure drops at a condition of constant flow rate.

Another important characteristic of a desirable heat transfer fluid is corrosion resistance. Many heat transfer fluid systems used with alternative power sources often have several metallic components. Illustrative metals found in heat transfer systems employed with alternative power sources include ferrous and non ferrous alloys such as stainless steel, aluminum, brass, braze alloy, and the like. However, such metals are vulnerable to corrosion as a result of contact with the heat transfer fluid.

There is therefore a need to provide corrosion inhibiting heat transfer fluids in heat transfer systems used with alternative power sources that minimize corrosion and prolong the service life of the heat transfer system. More particularly, there remains a need for low conductivity heat transfer fluids that inhibit the corrosion of heat transfer systems in thermal communication with alternative power sources.

Various methods for maintaining low electrical conductivity in a heat transfer fluid have been proposed. For example, WO 00/17951 proposes the use of an ion exchange resin unit to maintain adequate purity of a pure glycol and water heat transfer fluid mixture in a fuel cell system. CA 2 435 593 discloses a method for deionizing a heat transfer medium of a fuel cell utilizing a two heat transfer circuit arrangement and a deionization cell wherein a diluate flows in one heat transfer circuit flowing through a fuel cell stack and a concentrate flow can be part of a secondary heat transfer circuit.

Fuel cell heat transfer fluids must also have high heat capacity, low viscosity, and high thermal conductivity. Such properties help minimize pressure drops and reduce pumping power requirements while still meeting heat transfer requirements. Good surface wetting properties are also desirable in a fuel cell heat transfer fluid. A heat transfer fluid with good surface wetting characteristics is helpful in reducing pressure drops at a condition of constant flow rate.

Another important characteristic of a desirable heat transfer fluid is corrosion resistance. Heat transfer systems often have several metallic components. Illustrative metals found in fuel cell heat transfer systems and other heat transfer systems include ferrous and non ferrous alloys such as stainless steel, aluminum, brass, braze alloy, and the like. However, such metals are vulnerable to corrosion as a result of contact with the heat transfer fluid.

There is therefore a need provide corrosion inhibiting heat transfer fluids that minimize corrosion of metallic heat transfer system components and prolong the service life of fuel cell heat transfer systems and other heat transfer systems.

However, many of the corrosion inhibitors previously known for use in internal combustion engine heat transfer fluids are unsuitable for use in fuel cell heat transfer fluids because they are typically highly conductive ionic species. Illustrative examples of such corrosion inhibitors are silicates, nitrites, molybdates, nitrates, carboxylates, phosphates, borates, and the like. Such ionic corrosion inhibitors cannot be used in fuel cell heat transfer fluids because of the requirement that fuel cell heat transfer fluids have very low conductivity. One major drawback of ion exchange resins or electrodeionization cell methods is that they may remove corrosion inhibitors. As a result, the fuel cell heat transfer fluid may lose its ability to inhibit the corrosion of metal components of the fuel cell heat transfer system.

As a result, the prior art has failed to provide an effective resolution to problems associated with the maintenance of low conductivity in corrosion inhibiting heat transfer fluids for assemblies comprising alternative power sources such as fuel cells.

In addition, heat transfer fluids used in traditional automotive internal combustion engines are almost always colored by the addition of a dye to provide identity and prevent confusion with other functional fluids used in automobiles. Such coloring is also intended to provide information as to the concentration of the heat transfer fluid and to allow the heat transfer fluid to be recognizable during and after use in the heat transfer system.

However, dyes and colorants used in heat transfer fluids intended for use in internal combustion engines are typically highly conductive ionic species. Illustrative examples of such dyes and colorants are Direct Blue 199 (copper phthalocyanine, tetrasulfonic acid), Acid Green 25 (1,4-bis(4'-methyl-3'phenylsulfonato)amino anthraquinone), Acid Red 52 (sulforhodamine B) and uranine (sodium fluorescein). Such dyes cannot be used in fuel cell heat transfer fluids because of the requirement that fuel cell heat transfer fluids have very low conductivity.

Thus, the use of dyes can be problematic with respect to prior art methods for maintaining low electrical conductivity in heat transfer fluids. One major drawback of ion exchange resins or electrodeionization cell methods is that they may remove colorants, even very weakly ionically charged colorants and non-conductive colorants. As a result, the colored heat transfer fluid may appear to loose 'color' and the benefits obtained with the use of colorants.

As a result, the prior art has failed to provide an effective resolution to problems associated with the maintenance of low conductivity in colored heat transfer fluids.

SUMMARY OF THE INVENTION

Disclosed are a colorant treated ion exchange resin, a heat transfer system, an assembly comprising an alternative power source such as fuel cell, a fuel cell system, and a method of maintaining low conductivity in a colored heat transfer fluid.

In one embodiment, the colorant treated ion exchange resin comprises at least 15% of exchangeable groups comprising a colorant, based on the total number of exchangeable groups.

The disclosed heat transfer system in one embodiment comprises a circulation loop defining a flow path for a colored heat transfer fluid having a conductivity of less than 200 µS/cm, and a colorant treated ion exchange resin positioned in the flow path, wherein the colorant treated ion exchange resin comprises at least 15% of exchangeable groups comprising a colorant, based on the total number of exchangeable groups.

The disclosed assembly is powered by an alternative power source and comprises an alternative power source and a heat transfer system in thermal communication with the alternative power source, the heat transfer system comprising a circulation loop defining a flow path for a colored heat transfer fluid having a conductivity of less than 200 µS/cm, and an ion exchange resin positioned in the flow path, the ion exchange resin comprising ion exchangeable groups, wherein at least 15% of the total ion exchangeable groups comprise at least one of an ion, or a Lewis acid, or a Lewis base resulting from a colorant having a $pK_a$ or $pK_b$ of greater than 5 in an aqueous solution at 25° C., based on the total number of exchangeable groups. In one exemplary embodiment, the alternative power source is a fuel cell.

The fuel cell system in one embodiment comprises at least one fuel cell comprising an anode, a cathode, and an electrolyte; and a fuel cell heat transfer system in thermal communication with the at least one fuel cell, wherein the fuel cell heat transfer system comprises a circulation loop defining a flow path for a colored liquid heat transfer fluid having a conductivity of less than 200 µS/cm, and an ion exchange resin positioned in the flow path, the ion exchange resin comprising at least 15% of ion exchangeable groups comprising a colorant, based on the total number of exchangeable groups.

The disclosed method of maintaining a conductivity of less than 200 µS/cm in a colored heat transfer fluid comprises passing a colored heat transfer fluid through a heat transfer system, wherein the colored fuel cell heat transfer fluid has a conductivity of less than 200 μS/cm and the heat transfer system comprises a circulation loop defining a flow path for the colored heat transfer fluid, and an ion exchange resin positioned in the flow path, the ion exchange resin comprising at least 15% of exchangeable groups comprising a colorant, based on the total number of exchangeable groups.

DETAILED DESCRIPTION OF A PREFERRED EMBODIMENT

Figure 1:
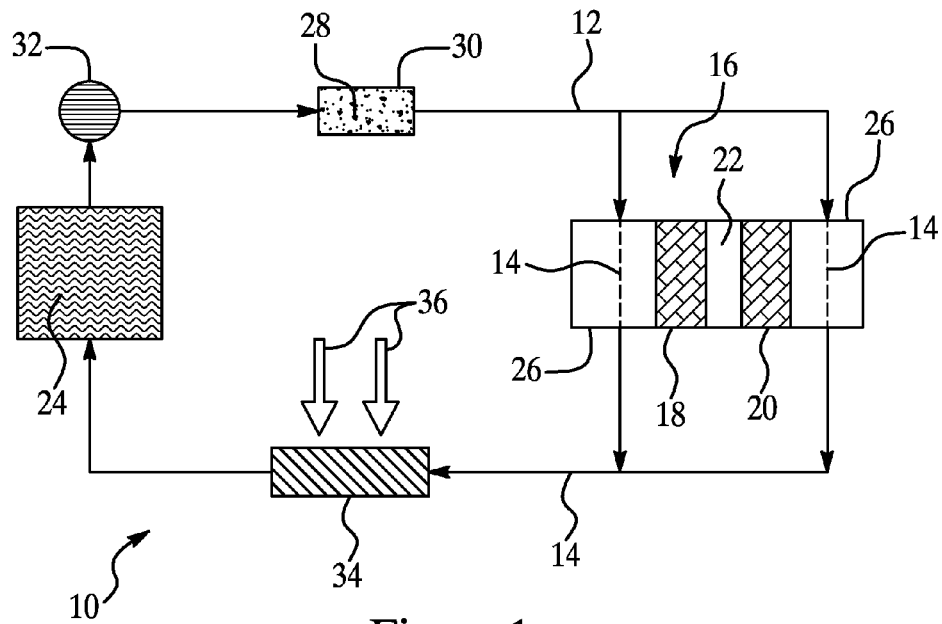
FIG. 1 is a schematic diagram of one embodiment of the disclosed heat transfer system and fuel cell system.

Disclosed is a colorant treated ion exchange resin, a heat transfer system, a fuel cell system, and a method of maintaining low conductivity in a colored heat transfer fluid.

The colorant treated ion exchange resin results from the pretreatment of ion exchange resins with one or more treatment colorants. In one embodiment, the disclosed colorant treated ion exchange resins may be made by contacting an ion exchange resin with an aqueous treatment solution containing one or more treatment colorants. The treatment results in the exchange of treatment colorant with at least some of the exchangeable groups in the ion exchangeable resin.

Illustrative examples of suitable ion exchange resins include anion exchange resins, cation exchange resins, mixed bed ion exchange resins, and mixtures thereof. The particular ion exchange resin selected is dependent upon the type of heat transfer fluid colorant used in the colored fuel cell heat transfer fluid.

The ion exchange resins suitable for use in the instant invention will generally have a polymer matrix and functional groups 'paired' with an exchangeable ion form.

The exchangeable ion form is generally one or more of $Na^+$, $H^+$, $OH^-$, or $Cl^-$ ions, depending on the type of ion exchangeable resin. These exchangeable ions exchange with the ionic species produced by the one or more colorants present in an aqueous colorant treatment solution. These exchangeable ions exchange with any ionic species produced by the one or more colorants present in an aqueous colorant treatment solution and in some cases with the ionic colorant species present in a colored heat transfer fluid, especially a colored fuel cell heat transfer fluid.

For example, if the colorants become negatively charged species in solution, i.e., for example if N-heterocyclic compounds are used as the colorants, the ion exchange resin should be a mixed bed resin, an anion exchange resin, or a mixture thereof. Commercially available anion exchange resins are typically in either $OH^-$ or $Cl^-$ forms. In one exemplary embodiment, a selected anion exchange resin will be in the $OH^-$ form.

Alternatively, if the colorants in the colored heat transfer fluid become positively charged species in solution, then mixed bed resins, cation exchange resins or a mixture thereof should be used. Commercially available cation exchange resins are typically in either $H^+$ or $Na^+$ forms. In one exemplary embodiment, a selected cation exchange resin will be in the $H^+$ form.

In one embodiment, ion exchange resins in $Na^+$ or $Cl^-$ forms will be used only if the treatment with the aqueous colorant solution results in the removal of substantially all of the $Na^+$ or $Cl^-$ ions from the ion exchange resin. For example, in one exemplary embodiment, ion exchange resins in $Na^+$ or $Cl^-$ forms will be used only if the treatment with the aqueous colorant solution results in the production of a colorant treated ion exchange resin having at least 80% of exchangeable groups comprising a colorant.

Examples of illustrative polymer matrices include polystyrene, polystyrene and styrene copolymers, polyacrylate, aromatic substituted vinyl copolymers, polymethacrylate, phenol-formaldehyde, polyalkylamine, combinations thereof, and the like. In one embodiment, the polymer matrix will be polystyrene and styrene copolymers, polyacrylate, or polymethacrylate, while in one exemplary embodiment; the polymer matrix will be styrenedivinylbenzene copolymers.

Examples of illustrative functional groups in cation ion exchange resins include sulfonic acid groups (—$SO_3H$), phosphonic acid groups (—$PO_3H$), phosphinic acid groups (—$PO_2H$), carboxylic acid groups (—COOH or —$C(CH_3)$—COOH), combinations thereof, and the like. In one embodiment, the functional groups in a cation exchange resin will be —$SO_3H$, —$PO_3H$, or —COOH, while in one exemplary embodiment; the functional groups in a cation exchange resin will be —$SO_3H$.

Examples of illustrative functional groups in anion exchange resins include quaternary ammonium groups, e.g., benzyltrimethylammonium groups (also termed type 1 resins), benzyldimethylethanolammonium groups (also termed type 2 resins), trialkylbenzyl ammonium groups (also termed type 1 resins); or tertiary amine functional groups, and the like. In one embodiment, the functional groups in an anion exchange resin will be trialkylbenzyl ammonium, trimethylbenzyl ammonium, or dimethyl-2-hydroxyethylbenzyl ammonium, while in one exemplary embodiment the functional groups in an anion exchange resin will be trialkylbenzyl ammonium.

Commercially available ion exchange resins suitable for use herein are available from Rohm & Haas of Philadelphia, Pa. as Amberlite™, Amberjet™, Duolite™, and Imac™ resins, from Bayer of Leverkusen, Germany as Lewatit™ resin, from Dow Chemical of Midland, Mich. as Dowex™ resin, from Mitsubishi Chemical of Tokyo, Japan as Diaion™ and Relite™ resins, from Purolite of Bala Cynwyd, Pa. as Purolite™ resin, from Sybron of Birmingham, N.J. as Ionac™ resin, from Resintech of West Berlin, N.J., and the like. In one embodiment, a suitable commercially available ion exchange resin will be Dowex™ MR-3 LC NG Mix mixed bed resin, Dowex™ MR-450 UPW mixed bed resin, Sybron Ionac™ NM-60 mixed bed resin, or Amberlite™ MB-150 mixed bed resin, while in one exemplary embodiment, a suitable commercially available ion exchange resin will be Dowex™ MR-3 LC NG Mix.

The colorant treated ion exchange resin is contacted with an aqueous treatment solution comprising a colorant. Such a colorant may be referred to as a 'treatment colorant'. Suitable treatment colorants for use in the aqueous treatment solution of colorant include weakly ionic colorants that are soluble or dispersible in an alcohol or in a mixture of one or more alcohols and water.

Colorants suitable for use as treatment colorants in one embodiment will have a $pK_a$ value of equal to or greater than 5 if it is an acid in aqueous solution at 25° C. In one exemplary embodiment, suitable treatment colorants will have a $pK_a$ value of from 5 to 14. In one especially exemplary embodiment, the suitable acid treatment colorants will have a $pK_a$ value of from 5 to less than 14.

If a treatment colorant is a base, the $pK_b$ value of suitable treatment colorants should be equal to or greater than 5 in aqueous solution at 25° C. In one exemplary embodiment, the suitable basic treatment colorants will have a $pK_b$ value of from 5 to 14. In one especially exemplary embodiment, the suitable basic treatment colorants will have a $pK_b$ value of from 5 to less than 14.

In one exemplary embodiment, suitable treatment colorants will possess good stability in a mixture of alcohol and water under fuel cell operating conditions, i.e., typically temperatures of from about 40° C. to about 100° C.

In one embodiment, the treatment colorant will comprise at least some minimum number of functional groups that will form an ionic species due to hydrolysis in an aqueous alcohol or alkylene glycol solution. In embodiment, the treatment colorant may comprise from 1 to 10 number of ionic forming functional group per molecule, more preferably from 1 to 5 per molecule of treatment colorant. Illustrative ionic forming functional groups are those selected from the group consisting of amine groups, heterocyclic aromatic groups, and other N-containing groups, and phenol or naphthol derivatives.

In one embodiment, the treatment colorant will comprise at least one of the following chromophores: anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more conjugated carbon-carbon double bonds (e.g., carotene), and combinations thereof. In one exemplary embodiment, the treatment colorant will comprise at least one of anthraquinone, acridine, thiazole, azo containing compounds, triarylmethane, diarylmethane, or combinations thereof. In one especially exemplary embodiment, the treatment colorant will comprise an azo containing compound as a chromophore.

In another embodiment, the treatment colorants will contain alkyleneoxy or alkoxy groups and at least one chromophore such as described above.

In one embodiment, the chromophore contained in the colorants will be selected from the group consisting of anthraquinone, triphenylmethane, diphenylmethane, azo containing compounds, disazo containing compounds, trisazo containing compounds, diazo containing compounds, and combinations thereof.

Alternatively, suitable treatment colorants may be described as those colorants of the formula:

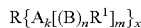

wherein R is an organic chromophore that is chemically stable, soluble at the use concentration and has a desirable toxicity profile; A is a linking moiety in said chromophore and is selected from the group consisting of O, N and S; k is 0 or 1; B is selected from the group consisting of one or more alkyleneoxy or alkoxy groups containing from 1 to 8 carbon atoms; n is an integer of from 1 to 100; m is 1 or 2; x is an integer of from 1 to 5; and $R^1$ is selected from the group consisting of H, $C_1$-$C_6$ alkyl or alkoxy groups containing from 1 to 8 carbon atoms, or combinations thereof.

In one exemplary embodiment, suitable treatment colorants are those colorants of the above formula wherein R is selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, or combinations thereof; B is selected from the group of one or more alkyleneoxy constitutuents containing from 2 to 4 carbon atoms, n is from 1 to 30, m is 1 or 2, X is preferably 1 or 2, and $R^1$ is preferably H or a $C_1$-$C_4$ alkyl or alkoxy groups containing from 1 to 6 carbon atoms.

The treatment colorants may be prepared by various known methods such as are described in U.S. Pat. Nos. 4,284,729, 6,528,564 B1, U.S. Pat. No. 6,635,350 B2 or other patents issued to Milliken & Company, Spartanburg, S.C., USA. For example, suitable treatment and/or heat transfer fluid colorants may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides, such as ethylene oxide and the like, according to known procedures, and then coupling the resulting compound with a diazonium salt of an aromatic amine. Colorants containing ionic species can be used if purification methods are used to remove the ionic species to provide the purified colorants with the necessary $pK_a$ or $pK_b$ values discussed above. Illustrative purification and chemical separation techniques include, treatment with ion exchange resins, reversed osmosis, extraction, absorption, distillation, filtration, etc. and similar processes used to remove the ionic species and obtained a purified colorant having a suitable $pK_a$ or $pK_b$. In order to prepare liquid colorants of the triarylmethane class, aromatic amines that have been reacted as stated above with an alkylene oxide are condensed with aromatic aldehydes and the resulting condensation products oxidized to form the triarylmethane liquid colorants. Other suitable colorants may also be prepared by these and other known procedures.

Commercially available examples of suitable treatment colorants for use in the disclosed treated ion exchange resins and methods of making and using include Liquitint® Red ST or other similar polymeric colorants from Milliken Chemical of Spartanburg, S.C., USA, or from Chromatech of Canton, Mich., USA. Other illustrative colorants include the following: Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Red HN, Liquitint Red ST, as well as combinations thereof.

In one exemplary embodiment, the treatment colorant will be at least one of Liquitint® Red ST from Milliken, Liquitint® Red XC from Chromatech, Chromatint® Yellow 1382 from Chromatech or Liquitint® Blue RE from Chromatech, while in an especially exemplary embodiment, the treatment colorant will be Liquitint® Red ST from Milliken or Liquitint® Red XC from Chromatech.

The aqueous colorant solution used to make the colorant treated ion exchange resins will generally have a concentration of treatment colorant as described above of at least 1000 ppm or at a temperature of greater than 2 degrees C. In one embodiment, the aqueous colorant solution will have a concentration of from 0.001% to 90% by weight, while in another embodiment; the aqueous colorant solution will have a concentration of from 0.005% to 10% by weight.

It will be appreciated that in one embodiment, the aqueous colorant solution will be made with deionized water.

In one embodiment, the ion exchange resin is contacted with the aqueous colorant solution for a period of time sufficient to allow the treatment colorant to exchange places with at least 15% of the total exchangeable groups, based on the total number of exchangeable ions in the ion exchange resin. That is, the colorant loading of the colorant treated ion exchange resin should be at least 15% of the exchange capacity of the ion exchange resin. In another embodiment, the period of contact is sufficient to allow the treatment colorant to exchange places with at least 50% of the total exchangeable groups, based on the total number of exchangeable ions in the ion exchange resin. In one exemplary embodiment, the period of contact is sufficient to allow the treatment colorant to exchange places with at least 75% of the total exchangeable groups, based on the total number of exchangeable ions in the ion exchange resin. In another exemplary embodiment, the period of contact is sufficient to allow the colorant loading to be an amount of from 15 to 99% of the total exchange capacity of the resin or from 15 to 99% of the total exchangeable groups, based on the total number of exchangeable ions in the ion exchange resin.

In one exemplary embodiment, the resultant colorant treated ion exchange resins will be cleansed with de-ionized water and/or clean fuel cell heat transfer fluid to minimize the chance for accidental introduction of impurities.

In one embodiment, the disclosed colorant treated ion exchange resin will be used in a fuel cell heat transfer system. In one exemplary embodiment illustrated in FIG. 1, a suitable fuel cell heat transfer system 10 will comprise a circulation loop 12 that defines a flow path 14 that is in thermal communication with at least one fuel cell 16 comprising an anode 18, a cathode 20, and an electrolyte 22. The term 'thermal communication' as used herein refers to any arrangement that allows heat produced by the exothermic reaction in the fuel cell 16 to be transferred to the colored heat transfer fluid by heat transfer. For example, in one embodiment as illustrated FIG. 1, the flow path 14 will pass through a heat transfer fluid channel 26 in the fuel cell 16. A colorant treated ion exchange resin 28 is placed in flow path 14 so that colored heat transfer fluid 24 must pass there through. In one embodiment, colorant treated ion exchange resin 28 may be placed in a filter 30 that is placed in the flow path 14 of circulation loop 12.

It will be appreciated that numerous configurations for circulation loop 12 are within the scope of the instant disclosures. For example, the heat transfer fluid channel 26 may be comprised of multiple channels or may be configured to wrap around the fuel cell 16. In general, the heat transfer fluid channels should be in close proximity to the electrode assembly surfaces where oxidation reaction of the fuel(s) and/or the reduction reaction of the oxidant(s) are taking place, so that effective heat transfer between heat transfer fluid and the electrode assembly can be accomplished. In addition, the heat transfer fluid channels and the fuel and oxidant flow channels are generally mechanically isolated from each other, so that undesirable interference among fuel, oxidant and heat transfer fluid will not occur.

In addition to fuel cell heat transfer systems, it will be appreciated that the disclosed treated ion exchange resins are suitable for use in applications having heat transfer systems that require heat transfer fluids having low conductivity. Examples include glass and metal manufacturing processes. Such processes often apply a high electrical voltage/current to electrodes used to keep the glass and/or metal in a molten state. Thus, it will be appreciated that the disclosed heat transfer systems may also be used in such applications.

It will be appreciated that the disclosed heat transfer fluids may be used in a variety of assemblies comprising one or more alternative power sources. The term 'alternative power source' as used here refers to power source technologies that provide improvements in energy efficiency, environmental concerns, waste production and management issues, natural resource management, and the like. Examples of alternative power sources that have been developed include, but are not limited to, batteries, fuel cells, solar cells or solar panels, photovoltaic cells, and internal combustion engines powered by the condensation of steam, natural gas, diesel, hydrogen, and/or the like. In one embodiment, the term 'alternative power source' includes devices powered by internal combustion engines operating with a clean heat transfer system, i.e., a heat transfer system that does not contribute to the concentration of ionic species in the heat transfer fluid. Such alternative power sources may be used alone or in combinations thereof, such as those employed in hybrid vehicles.

It will be appreciated that assemblies comprising such alternative power sources include any article traditionally powered by an internal combustion engine, such as automotive vehicles, boats, generators, lights, aircrafts and airplanes, trains or locomotives, military transport vehicles, stationary engines, and the like. The assemblies also include additional systems or devices required for the proper utilization of alternative power sources, such as electric motors, DC/DC converters, DC/AC inverters, electric generators, and other power electronic devices, and the like. The assemblies may also include systems or devices required for the proper utilization of the alternative power sources such as electric motors, DC/CC converters, DC/AC inverters, electric generators, and other power electronics and electrical devices, and the like.

The disclosed assemblies will generally comprise an alternative power source and a heat transfer system in thermal communication with the alternative power source. In one embodiment, the heat transfer system will comprise a circulation loop defining a flow path for a corrosion inhibiting liquid heat transfer fluid having a conductivity of less than 200 μS/cm. In one exemplary embodiment, the heat transfer system will comprise a circulation loop defining a flow path for a corrosion inhibiting liquid heat transfer fluid having a conductivity of less than 200 μS/cm and comprising a corrosion inhibitor comprising an azole compound, and at least one of a siloxane based surfactant, colloidal silica, or mixtures thereof.

Figure 3:
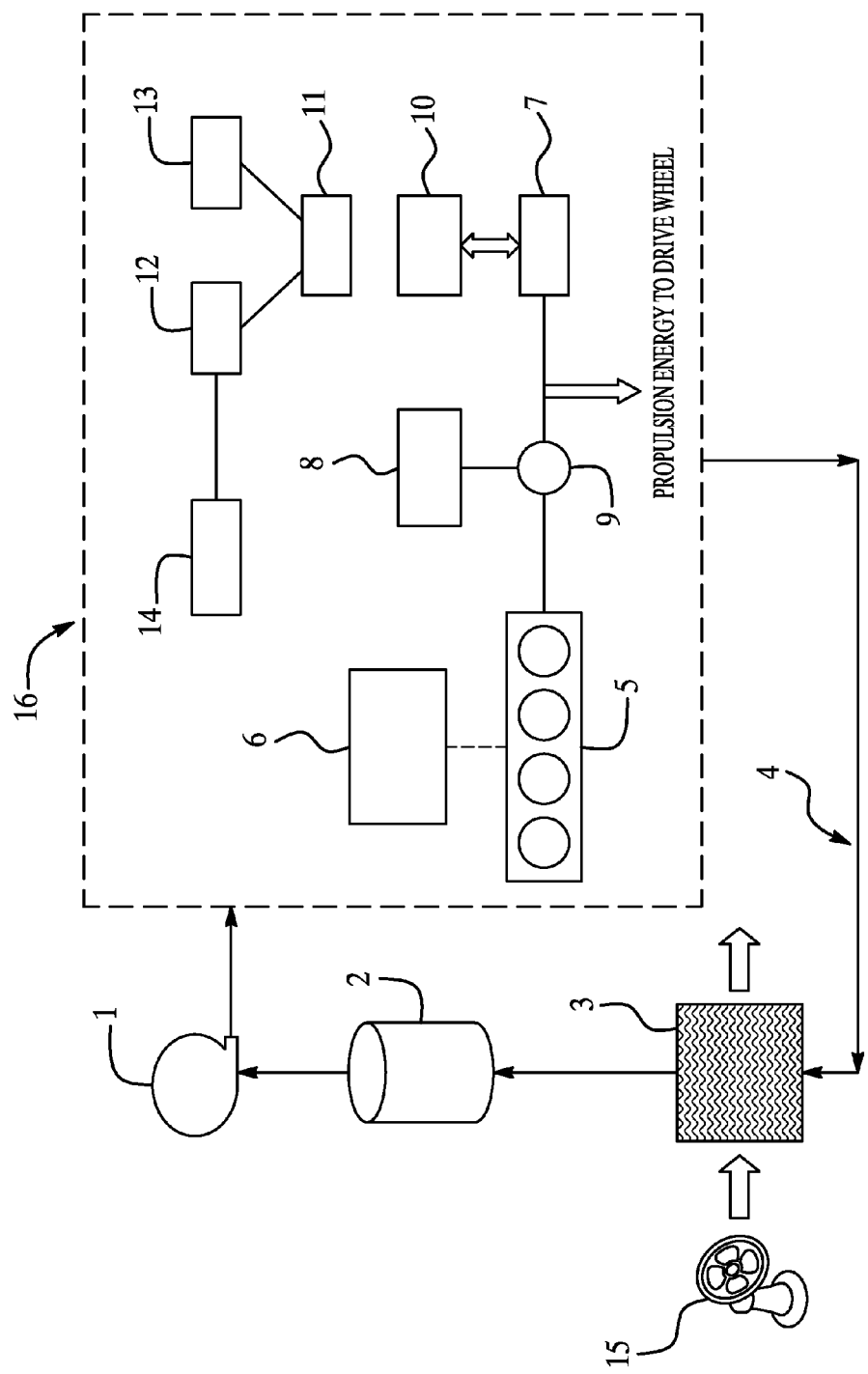
FIG. 3 is a schematic diagram of an illustrative assembly comprising an alternative power source and a heat transfer system, more particularly a hybrid vehicle cooling system.

As illustrative example of the disclosed assembly may be seen in FIG. 3. The major components of the cooling system, and the main system components 16 that may require the use of coolant or heat transfer fluid as cooling media are shown in the figure. As indicated therein, the assembly may contain internal combustion engine 5, or fuel cells 5 or solar cells 5 as the vehicle primary power source 7. It also contains a rechargeable secondary battery 12 or an optional ultra-capacitor 13 that may be charged via the vehicle regenerative braking system. In this embodiment, the battery 12 and/or the ultra-capacitor 13 may act as secondary power sources. The assembly may also contain power electronic devices, such as DC/DC converters 10, DC/AC inverters 10, generators 8, power splitting devices 9, and/or voltage boost converters 11, etc. In addition, the assembly may also contain fuel cell or solar cell "balance of plant" subsystems 6. These may be air compressors, pumps, power regulators, etc. The assembly also contain HAVC systems 14, e.g., air-conditioning system for the climate control of vehicle interior space. These are included in the vehicle system 16 in the illustrated assembly of FIG. 1 that may require the use of coolant or heat transfer fluid for temperature control. Similar to other vehicle cooling systems, the assembly in the illustrate example also contain a coolant recirculation pump 1, coolant flow path 4, coolant tank 2, and a radiator or heat exchanger 3, and a fan 15. The fan may be substituted by an external cooling source, e.g., a different (or isolated) cooling system with its own cooling media.

In one embodiment, the alternative power source will be a fuel cell. It will be appreciated that a fuel cell is in thermal communication with the disclosed heat transfer systems and fluids, the electrical conductivity of the disclosed heat transfer fluids will be, in one embodiment, no more than 10 µS/cm. In an especially exemplary embodiment comprising a fuel cell, the disclosed heat transfer fluids will have an electrical conductivity of from 0.02 to no more than 10 µS/cm. In one especially exemplary embodiment, the disclosed corrosion inhibiting heat transfer fluids will have an electrical conductivity of from 0.05 to no more than 5 µS/cm.

The disclosed treated ion exchange resins may be used with a number of different types of fuel cells comprising an electrode assembly comprising an anode, a cathode, and an electrolyte, and a heat transfer fluid in thermal communication with the electrode assembly or fuel cell. In one embodiment the disclosed treated ion exchange resins may be contained in a flow path defined by a circulation loop or heat transfer fluid flow channel in thermal communication with said fuel cell.

Illustrative types of suitable fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the disclosed corrosion inhibiting heat transfer fluids will be used in PEM and AFC fuel cells.

In one embodiment, the disclosed heat transfer systems, assemblies, and fuel cell systems will also employ suitable colored heat transfer fluids that may be characterized as having very low conductivity.

The term 'heat transfer fluid' as used herein refers to a liquid that is capable of transfers and dissipating a quantity of thermal energy from a first point to second point. In one embodiment, the disclosed heat transfer fluids may be referred to as coolants. In another embodiment, the disclosed heat transfer fluids may also be referred to as antifreeze, due to the ability of some heat transfer fluids to function as freezing point depressants.

The term 'low conductivity' as used herein generally refers to electrical conductivities of no more than 200 µS/cm. In one embodiment, the disclosed colored heat transfer fluids will have a conductivity of less than 150 µS/cm, while in another embodiment, the disclosed colored heat transfer fluids will have a conductivity of less than 50 µS/cm.

In other embodiments, the disclosed colored heat transfer fluids will have an electrical conductivity of from 0.02 µS/cm to no more than 200 µS/cm. In one embodiment, the disclosed colored heat transfer fluids for use in fuel cells will have a conductivity of from 0.2 µS/cm to 100 µS/cm. In another embodiment, the disclosed colored heat transfer fluids will have a conductivity of from 0.05 to less than 50 µS/cm, while in one exemplary embodiment, the disclosed colored heat transfer fluids will have a conductivity of from 0.05 to no more than 25 µS/cm. In an especially exemplary embodiment, the disclosed colored heat transfer fluids will have an electrical conductivity of from 0.05 to no more than 10 µS/cm. In one especially exemplary embodiment, the disclosed colored heat transfer fluids will have an electrical conductivity of from 0.05 to no more than 5 µS/cm.

The electrical conductivity of the disclosed colored heat transfer fluids may be measured by using the test methods described in ASTM D1125, i.e., "Standard Test Methods for Electrical Conductivity and Resistivity of Water" or an equivalent method.

The disclosed colored heat transfer fluids may also be corrosion inhibiting. The term 'corrosion inhibiting heat transfer fluid' refers to a heat transfer fluid having a sufficient amount of one or more corrosion inhibitors such that metallic components immersed in said fluid have a reduced rate of corrosion relative to their corrosion in a heat transfer fluid that is identical in all respects except that it lacks any corrosion inhibitors.

A 'colored heat transfer fluid' as used herein refers to a heat transfer fluid having a sufficient amount of one or more colorants such that the color of the heat transfer fluid may be measured by either the naked eye or by analytical techniques using selective absorption or scattering of visible light, i.e., light with wavelengths of approximately between 350 nm and 750 nm.

In one embodiment, the disclosed colored heat transfer fluids will comprise a non-conductive colorant. In another embodiment, the disclosed colored heat transfer fluids will comprise at least one alcohol in addition to the non-conductive colorant. In one exemplary embodiment, the disclosed colored heat transfer fluids will comprise a non-conductive colorant, at least one alcohol, and water. In another exemplary embodiment, the disclosed colored heat transfer fluids will comprise a nonconductive colorant, water, at least one alcohol, a corrosion inhibitor, and optionally one or more of an antifoam agent, a bittering agent, a wetting agent, a non-ionic dispersant, combinations thereof, and the like.

'Heat transfer fluid' as used herein refers to both concentrated solutions of the corrosion inhibitor and alcohol or water/alcohol mixtures as well as to diluted solutions of the same mixed with water, preferably deionized water. It will be appreciated that although heat transfer fluid may be purchased, transported or used in concentrated solutions consisting mainly of one or more alcohols and corrosion inhibitor, such concentrates will often be diluted with water, especially deionized water, prior to incorporation or use in a fuel cell. Dilution ratios of from 1:4 to 4:1 (DI water:Heat transfer fluid) are typical, with ratios of from 40%:60% to 60%:40% being used in one exemplary embodiment. Thus, the term 'heat transfer fluid' as used herein refers to both concentrated solutions and dilute solutions of the disclosed heat transfer fluids.

In one embodiment, suitable heat transfer fluids will comprise a heat transfer fluid colorant as described herein. In another embodiment, suitable heat transfer fluids will also comprise a heat transfer fluid inhibitor as described herein. In another embodiment, suitable heat transfer fluids will comprise at least one alcohol in addition to the colorant and corrosion inhibitor. In one exemplary embodiment, suitable heat transfer fluids will comprise a corrosion inhibitor, at least one alcohol, and water. In another exemplary embodiment, a heat transfer fluids will comprise a corrosion inhibitor as disclosed herein, water, at least one alcohol, a colorant, and optionally one or more additives such as an antifoam agent, a bittering agent, a wetting agent, a non-ionic dispersant and the like.

As discussed above, in one exemplary embodiment, the heat transfer fluid used in the disclosed heat transfer systems and fuel cell systems will be a colored heat transfer fluid that comprises at least one colorant. The colorant used in the colored heat transfer fluid, i.e., a 'heat transfer fluid colorant' may be the same or different with respect to the 'treatment colorant' used in the aqueous treatment solution and described above.

However, it will be appreciated that truly non-conductive species that do not produce an ionic species in a heat transfer fluid may also be used as the heat transfer fluid colorant in addition to those colorant suitable for use as treatment heat transfer fluids. In contrast with the term 'non-conductive' as it relates to a treatment colorant, the term 'non-conductive' with respect to a heat transfer fluid colorant refers to a colorant that produces a conductivity of less than about 0.5 µS/cm when introduced into a standard solution of deionized water with a conductivity of less than 0.30 µS/cm, at a maximum concentration of no more than 0.2% by weight, based on the total weight of the standard solution. In one embodiment, a 'non-conductive' colorant will be a non-ionic species in its pure form. In one exemplary embodiment, suitable acidic heat transfer fluid colorants will have a $pK_a$ value of equal to or greater than 5 at 25° C. while suitable basic heat transfer fluid colorants will have a $pK_b$ value equal to or greater than 5 at 25° C. in aqueous solution. In one particularly exemplary embodiment, suitable acidic heat transfer fluid colorants will have a $pK_a$ value of greater than 5 and less than 14 at 25° C. while suitable basic heat transfer fluid colorants will have a $pK_b$ value greater than 5 and less than 14 at 25° C. in aqueous solution.

In one embodiment, at least one treatment colorant present in a colorant treated ion exchange resin will be the same as at least one heat transfer fluid colorant used in a colored fuel cell heat transfer fluid. In another embodiment, at least one treatment colorant present in a colorant treated ion exchange resin will be the same as at least one heat transfer fluid colorant used in a colored fuel cell heat transfer fluid that is used in a fuel cell heat transfer system employing said colorant treated ion exchange resin. In one exemplary embodiment, the treatment colorants present in a colorant treated ion exchange resin will be the same as the heat transfer fluid colorants used in a fuel cell heat transfer fluid used in a fuel cell heat transfer system employing said colorant treated ion exchange resin.

In one embodiment, a heat transfer fluid colorant will be a non-conductive colorant that is substantially free of functional groups that will form an ionic species due to hydrolysis in an aqueous alcohol or alkylene glycol solution. "Substantially free" as used herein refers to an amount that is not in excess of an amount that will lead to the conductivity of the colored heat transfer fluid being higher than 5 µS/cm. Examples of the functional groups will produce small amount of ionic species include many N-containing compounds, e.g., acridine, amine, thiazole, cresol, etc. Compounds containing sulfonic acid groups, phosphonic acid groups, carboxylic acid groups, etc. will also produce ionic species upon hydrolysis in aqueous solution. Since these groups have a smaller $pK_a$ value, the solution is more ionic or conductive than the previous group (i.e., the N-containing compounds). In one specific embodiment, a non-conductive heat transfer fluid colorant will substantially free of functional groups selected from the group consisting of carboxylate groups, sulfonate groups, phosphonate groups, quaternary ammonium groups, groups that carry a positive charge, and groups that carry a negative charge. Illustrative examples of groups that carry a positive charge include $Na^+$, $Cu^{2+}$, $N^+(CH_3)_3$, $Fe^{3+}$, combinations thereof, and the like. Illustrative examples of groups that carry a negative charge include $Cl^-$, $Br^-$, $SO_4^{2-}$, combinations thereof, and the like. However, in other embodiments, suitable heat transfer fluid colorants will not be nonconductive as that term is defined above with respect to heat transfer fluid colorants, and will comprise such functional groups.

Notwithstanding the foregoing specific embodiments, the heat transfer fluid colorant may generally be described as indicated above with respect to treatment colorants. That is, suitable heat transfer fluid colorants may comprise at least one of the following chromophores: anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups (e.g., stilkene, and/or bestriazenylamino-stilkene, and/or pyrazoline, and/or courmarine type molecule or mixture thereof), one or more conjugated carbon-carbon double bonds (e.g., carotene), or combinations thereof. In one exemplary embodiment, the heat transfer fluid colorant will comprise at least one of diarylmethane, triphenylmethane, one or more conjugated aromatic groups, azo, or combinations thereof. In one especially exemplary embodiment, the heat transfer fluid colorant will comprise at least one or more conjugated aromatic groups as a chromophore.

In another embodiment, the heat transfer fluid colorant will comprise the reaction product of a non-conductive alkoxy compounds and at least one chromophore such as described above. Illustrative examples of suitable non-conductive alkoxy compounds include those having from 1 to 30 carbons. Illustrative alkoxy compounds include ethylene oxide, propylene oxide, butylene oxide, and the like, with ethylene oxide and propylene oxide being particularly suitable. In one embodiment, the chromophore reacted with the alcohol will be selected from the group consisting of anthraquinone, triphenylmethane, diphenylmethane, diarylmethane, triarylmethane, azo containing compounds, disazo containing compounds, trisazo containing compounds, diazo containing compounds, and combinations thereof.

Alternatively, suitable heat transfer fluid colorants may be described as those of the formula:

$$R\{A_k[(B)_n R^1]_m\}_x$$

wherein R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, two or more conjugated aromatic groups, two or more conjugated heterocyclic groups, or combinations thereof; A is a linking moiety in said chromophore and is selected from the group consisting of O, N or S; k is 0 or 1; B is selected from the group consisting of one or more alkyleneoxy or alkoxy groups containing from 1 to 8 carbon atoms; n is an integer of from 1 to 100; m is 1 or 2; x is an integer of from 1 to 5; and $R_1$ is selected from the group consisting of H, $C_1$-$C_6$ alkyl or alkoxy groups containing from 1 to 8 carbon atoms, or combinations thereof.

In one exemplary embodiment, suitable heat transfer fluid colorants are those colorants of the above formula wherein B is selected from the group of one or more alkyleneoxy constituents containing from 2 to 4 carbon atoms, n is from 1 to 30, m is 1 or 2, X is preferably 1 or 2, and R1 is preferably H or a $C_1$-$C_4$ alkyl or alkoxy groups containing from 1 to 6 carbon atoms. In one exemplary embodiment, suitable heat transfer fluid colorants are those containing one or more of diarylmethane, triarylmethane, triphenylmethane, diphenylmethane, conjugated aromatic groups or conjugated carbon-carbon double bonds or a combination thereof, since such are not expected to contribute to conductivity increase from the chromophore. In other words, these chromophore structure have no groups that will hydrolyze. Among the listed linking group, O may also be less likely to hydrolyze in aqueous solution.

The heat transfer fluid colorants may be prepared by various known methods as are described above with respect to the treatment colorants.

Commercially available examples of suitable heat transfer fluid colorants for use in colored heat transfer fluids suitable for use in the disclosed fuel cells and fuel cell systems include Liquitint® Red ST or other similar polymeric colorants from Milliken Chemical of Spartanburg, S.C., USA, or colorants (e.g., Liquitint® Blue RE) from Chromatech of Canton, Mich., USA. Other illustrative colorants include the following: Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Red HN, Liquitint Red ST, as well as combinations thereof.

In one exemplary embodiment, the heat transfer fluid colorant will be at least one of Liquitint® Red ST from Milliken, Liquitint® Red XC from Chromatech, Liquitint® Patent Blue from Milliken, Chromatint® Yellow 1382 from Chromatech or Liquitint® Blue® RE from Chromatech, while in an especially exemplary embodiment, the non-conductive colorant will be Liquitint® Blue RE from Chromatech.

In one embodiment, the heat transfer fluid colorant will be present in the colored fuel cell heat transfer fluid in an amount of from 0.0001 to 0.2% by weight, based on the total amount of the colored heat transfer fluid. In another embodiment, the heat transfer fluid colorant will be present in the heat transfer fluid in an amount of from 0.0005-0.1% by weight, based on the total amount of the heat transfer fluid, while in one exemplary embodiment, the heat transfer fluid colorant will be used in an amount of from 0.0005 to 0.05% by weight, based on the total amount of the heat transfer fluid.

Illustrative examples of suitable alcohols for use in the disclosed heat transfer fluids are methanol, ethanol, propanol, butanol, furfurol, ethylene glycol, diethylene glycol, triethylene glycol, 1,2-propylene glycol, 1,3-propylene glycol, dipropylene glycol, butylene glycol, glycrol, monoethylether of glycerol, dimethyl ether of glycerol, 1,2,6-hexanetriol, trimethylolpropane, methoxyethanol, or a combination comprising one or more of such alcohols. Illustrative examples of particularly suitable alcohols include ethylene glycol, propylene glycol, butyl glycol, glycerol, diethylene glycol, and the like, as well as mixtures thereof. In one embodiment, the alcohol will be ethylene glycol or 1,2-propylene glycol or 1,3-propylene glycol, while in one exemplary embodiment; the disclosed colored heat transfer fluid will comprise ethylene glycol.

In one embodiment, the alcohol will be present in the heat transfer fluid in an amount of from 10-99.9% by weight, based on the total amount of the colored heat transfer fluid. In another embodiment, the at least one alcohol will be present in the heat transfer fluid in an amount of from 20-99.9% by weight, based on the total amount of the heat transfer fluid, while in one exemplary embodiment, the at least one alcohol will be used in an amount of from 20 to 99.9% by weight, based on the total amount of the colored heat transfer fluid.

As previously indicated, water may be present in the disclosed colored fuel cell heat transfer fluids. In one exemplary embodiment, deionized water will be used. In one embodiment, water will be present in the colored heat transfer fluid in an amount of from 0.1-90% by weight, based on the total amount of the heat transfer fluid. In another embodiment, water will be present in the heat transfer fluid in an amount of from 0.1-80% by weight, based on the total amount of the heat transfer fluid, while in one exemplary embodiment, water will be used in an amount of from 0.1 to 70% by weight, based on the total amount of the colored heat transfer fluid.

For example, water may not be present in the concentrate version of a heat transfer fluid at all, i.e., 0 wt % but may be present in some concentrates in amounts up to about 50 wt %, in others up to 20 wt %, based on the total weight of the concentrate. With regards to diluted heat transfer fluids; water may be present in amounts of from 20 wt % up to 90% wt.

Suitable corrosion inhibitors include aluminum and aluminum based alloy corrosion inhibitors, copper and copper based alloy corrosion inhibitors, ferrous metal corrosion inhibitors, such as, azole derivatives, and amines such as ethanolamine, diethanol amines, triethanolamine, octylamine and morpholine, orthosilicate ester as described in US2004/0028971A1 and the like.

In one embodiment, one or more corrosion inhibitors will be present in the heat transfer fluid in an amount of from 0.0 to 10.0% by weight, based on the total amount of the colored heat transfer fluid. In another embodiment, one or more corrosion inhibitors will be present in the heat transfer fluid in an amount of from 0.0-5% by weight, based on the total amount of the heat transfer fluid, while in one exemplary embodiment, one or more corrosion inhibitors will be used in an amount of from 0.0 to 2% by weight, based on the total amount of the colored heat transfer fluid.

Suitable colored heat transfer fluids may also comprise additional additives such as defoamers, surfactants, scale inhibitors, dispersants, wetting agents, bittering agents, and the like, in amounts of up to 10% by weight, based on the total amount of the colored heat transfer fluid.

In one embodiment, suitable colored heat transfer fluids will comprise from 20-99.9% by weight of at least one alcohol or an alcohol mixture, from 0.1-80% by weigh of water, and from 0.0001 to 0.1% by weight of a non-conductive colorant, based on the total amount of the heat transfer fluid, and 0.0 to 10% by weight of other optional heat transfer fluid additives. In one exemplary embodiment, the disclosed heat transfer fluids will comprise from 20-99.9% by weight of at least one alcohol or an alcohol mixture, from 0.1-80% by weigh of water, and from 0.0001 to 0.1% by weight of a non-conductive colorant, and 0.0 to 10% by weight of other heat transfer fluid additives based on the total amount of the heat transfer fluid.

In another exemplary embodiment, suitable heat transfer fluids will comprise from 20-99.9% by weight of at least one alcohol, from 0.1-80% by weigh of water, from 0 to 5% by weight of one or more corrosion inhibitors, and from 0.0001 to 0.1% by weight of a non-conductive colorant and an optional antifoam agent in an amount of from 0.0 to 0.1% by weight, based on the total amount of the heat transfer fluid.

The colored heat transfer fluids may be prepared by mixing the components together. Normally, the alcohol and water are preferably mixed together first. The other additives are then added to the alcohol-water mixture by mixing and adequate stirring.

The disclosed colorant treated ion exchange resins are advantageous in that they are capable of removing ionic species from a treatment solution or heat transfer fluid, maintaining low conductivity in a colored heat transfer fluid and providing color to a colored heat transfer fluid. The disclosed colorant treated ion exchange resins are also advantageous in that they are capable of simultaneously removing ionic species from a heat transfer fluid, maintaining low conductivity in a colored heat transfer fluid and providing color to a colored heat transfer fluid.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

EXAMPLE 1

The conductivity as a function of colorant concentration in de-ionized water at room temperature was evaluated per Table 1. Solutions of the various colorants identified below were mixed in de-ionized water at room temperature under simple agitation. Conductivity was measured via a Traceble® bench conductivity meter manufactured by Control Company, Friendswood, Tex., USA.

TABLE 1

| Colorant Name | Concentration of Colorant in Solution (mg/L) | Conductivity of Solution (µS/cm) |
|---|---|---|
| Uranine[1] | Blank | 0.30 |
|  | 20 | 3.36 |
|  | 50 | 8.27 |
|  | 100 | 16.67 |
| Liquitint ® Red ST | Blank | 0.27 |
|  | 20 | 0.45 |

TABLE 1-continued

| Colorant Name | Concentration of Colorant in Solution (mg/L) | Conductivity of Solution (µS/cm) |
|---|---|---|
|  | 50 | 0.58 |
|  | 100 | 0.65 |
| Liquitint ® Bright Yellow | Blank | 0.28 |
|  | 20 | 1.97 |
|  | 50 | 4.35 |
|  | 100 | 8.36 |
| Liquitint ® Patent Blue | Blank | 0.30 |
|  | 20 | 1.79 |
|  | 50 | 3.95 |
|  | 100 | 7.41 |
| Liquitint ® Bright Orange | Blank | 0.28 |
|  | 20 | 1.11 |
|  | 50 | 2.23 |
|  | 100 | 4.05 |
| Acid Red 52[1] | Blank | 0.25 |
|  | 20 | 5.98 |
|  | 50 | 13.4 |
|  | 100 | 33.9 |

[1]Acid Red 52 is commercially available from Chromatech of Canton, MI. Uranine is commercially available from Honeywell-CPG of Danbury, CT It can be seen that the two commonly used antifreeze dyes, i.e., Uranine and Acid Red 52 dye possess higher conductivity than the evaluated Liquitint® dyes at equivalent concentrations.

EXAMPLE 2

The Liquitint® Red ST dye was also found to be stable at 80° C. in 50% Ethylene glycol+50% de-ionized water (all as volume %). A test was done by dissolving 20 ppm Liquitint® Red into 50% ethylene glycol+50% de-ionized water solution (V/V). The solution was separated into two parts in two clean beakers. One was heated at 80° C. for about 45 minutes. The conductivity of the two solutions before and after the heating was recorded. There was no noticeable change in the solutions. The conductivity of the solution showed essentially no change before and after heating (Blank and before heating at 80° C.: 0.45 µS/cm; kept at 80° C. for ~45 min and cooled down to room temperature: 0.48 µS/cm).

EXAMPLE 3

The effect of the non-conductive dyes upon the corrosion of metals in a fuel cell heat transfer system was evaluated.

Metal samples according to the following were cleaned with cleaner and de-ionized water before separating into two identical sets and put in 2 clean glass flasks. Each flask contained 4 cast Al coupons, 4 brass coupons, 4 stainless steel (SS316) coupons, 2 brazed Al coupon, 2 silicone gasket, 4 Viton O-rings. The total surface area was about 392 square centimeters. 300 ml 50% ethylene glycol+50% (volume) DI water was added into one flask while 300 ml 50% ethylene glycol+50% (volume) DI water+20 ppm Liquitint® Red ST was added to the second flask.

The conductivity of each solution was recorded as a function of time. Since corrosion of the metals will generate ionic species and increase the solution conductivity, the conductivity of the solution was used to indicate the extent of the corrosion of the metal samples in the flasks. The results obtained are listed below in Table 2.

TABLE 2

| Time | Conductivity of the Solution with 20 ppm Liquitint® Red ST (µS/cm) | Conductivity of the Solution without the Dye (µS/cm) |
|---|---|---|
| 0 min | 0.50 | 0.49 |
| 20 min | 0.50 | 0.50 |
| 40 min | 0.51 | 0.49 |
| 100 min | 0.54 | 0.52 |
| 16 hours | 0.83 | 0.71 |

Little difference in conductivity was observed, indicating that 20 ppm Liquitint® Red ST has no effect on metal corrosion under the test conditions. Thus, Liquitint® Red ST dye added to glycol/water mixture in an amount of 20 ppm did not enhance the corrosion of metals likely to be present in fuel cell heat transfer systems.

EXAMPLE 4

The removal of a colorant suitable for use as either a treatment colorant or a heat transfer fluid colorant by a mixed bed resin was demonstrated.

50 mg/l Liquitint® Red ST was added to 200 g of 50% wt ethylene glycol in DI water solution in a beaker. The solution was separated into two equal parts. 2 g of Rohm & Haas Amberjet UP6040 mixed bed resin was added to one part of the solution. The solution was under constant stirring by the use of a clean Teflon coated magnet bar at room temperature. After about 16 hours, the initially red solution became faintly red color indicating that the resin had removed most (e.g., greater than about 95%) of the Liquitant® Red ST colorant.

EXAMPLE 5

The conductivity of various colorants suitable for use as treatment and/or heat transfer fluid colorants was evaluated. 50% wt ethylene glycol+50% wt DI water solutions at room temperature were prepared with various colorants at typical use concentrations as indicated below in Table 3.

TABLE 3

| Dye | Concentration (mg/L) | Conductivity (µS/cm) |
|---|---|---|
| Stock Solution 50% Ethylene Glycol Conductivity 0.40 µS/cm 85 C. | | |
| Chromatint Yellow 1382 | 100 | 1.37 |
| L85000 Liquitint Patent Blue | 100 | 2.75 |
| Liquitint Blue RE | 100 | 0.56 |
| Liquitint Red XC | 100 | 0.46 |
| Stock Solution 50% Ethylene Glycol Conductivity 0.43 µS/cm C. | | |
| Chromatint Yellow 1382 | 50 mg/L | 0.91 |
| L85000 Liquitint Patent Blue | 50 mg/L | 1.61 |
| Liquitint Blue RE | 50 mg/L | 0.53 |
| Liquitint Red XC | 50 mg/L | 0.45 |
| Stock Solution 50% Ethylene Glycol Conductivity 0.42 µS/cm 36 C. | | |
| Chromatint Yellow 1382 | 20 | 0.63 |
| L85000 Liquitint Patent Blue | 20 | 0.89 |

It can be seen that the various colorants were suitable in as much as they provided heat transfer fluid solutions having low conductivity.

EXAMPLE 6

The compatibility of various treatment/heat transfer fluid colorants having low conductivity with mixed bed ion exchange resins with cation resin in H$^+$ form and the anion resin in OH$^-$ form was evaluated.

50 mg/l colorant solution in 50% wt ethylene glycol+50% wt DI water was prepared. 100 g of the solution was added into a beaker. 2 g of MTO-Dowex MR-3 LC NG mixed bed resin was added to the solution. The solution was under constant stirring by the use of a clean teflon coated magnet bar at room temperature. The concentrations of the colorants in the solution were determined by UV-Vis spectroscopic measurements. The colorants used in the tests were L83002 Liquintint Red XC and L85071 Liquintint Blue RE supplied by Chromatech. The maximum absorption peak at 535 nm was used to determine the concentration of Liquitint Red XC dye. The maximum absorption peak at 632 nm was used to determine the concentration of Liquitint Blue RE dye. The following results were obtained.

After 21 hours, the concentration of L83002 Liquintint Red XC in 50% EG was reduced to 11 ppm from an initial concentration of 50 ppm, indicating it's suitability as either a treatment colorant or a heat transfer fluid colorant. The concentration of L85071 Liquintint Blue RE had little change, i.e., 48 ppm at 21.5 hours vs. an initial concentration of 50 ppm, indicating that the L85071 Liquintint Blue RE could be used as non-conductive heat transfer fluid colorant.

EXAMPLE 7

A colorant treated mixed bed ion exchange resin according to the invention was evaluated.

An aqueous solution of Liquitint Red ST from Milliken was used to treat a mixed ion exchange resin. The resin was MTO-Dowex MR-3 LC NG wherein the cation resin is in H$^+$ form and the anion resin is in OH$^-$ form. Ten grams of MTO-Dowex MR-3 LC NG was added into one liter 5 g/l Liquitint Red ST dissolved in 50% ethylene glycol under constant magnetic bar stirring at room temperature. After 24 hours, another 5 g of the Liquiting Red STdye were added to the solution. The dye exchange reaction was allowed to continue for more than 24 hours before the resin was separated from the dye containing 50% EG solution. The colorant saturated was rinsed with a large amount of DI water to wash away the excessive colorant solution (until the rinse water became colorless) and dried with a clean paper towel and stored in a clean glass bottle. Since the color of solution did not show visible change after the first 24 hours of the treatment, the colorant loading on the resin was estimated to be closed to saturation at the end of the treatment, e.g., the colorant loading on the resin was likely to be higher than 90% capacity loading of the resin for the colorant.

Figure 2:
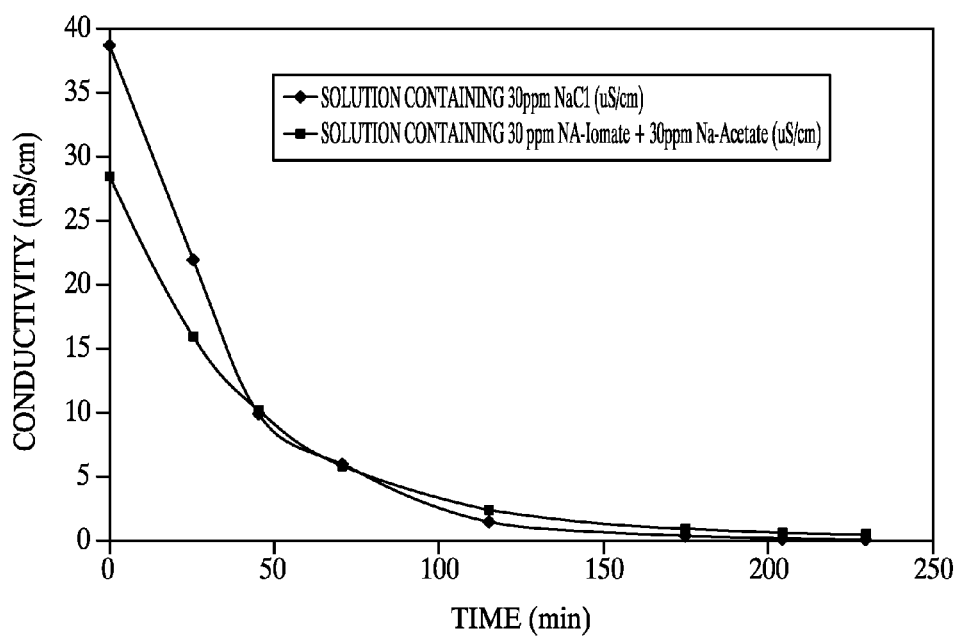
FIG. 2 is a graph illustrating experimental results and measuring conductivity versus time.

One gram of colorant saturated resin was added to two 100 g samples of a 50% ethylene glycol aqueous solution respectively containing 30 ppm NaCl or 30 ppm sodium formate+30 ppm sodium acetate. The solutions were stirring constantly with a magnetic bar. The tests were conducted at room temperature. The solution conductivity was measured as a function of time. The following results as set forth in FIG. 2 were obtained. Generally, the solution became red soon after the resin was added into the salt containing solutions. The color became more prominent as time increased, showing that the disclosed colorant-saturated resin is capable of removing the ionic species from the solutions while providing a distinct color to the 50% wt ethylene glycol aqueous solution. This illustrates that colorant treated ion exchange resins made according to the instant disclosures are capable of simultaneously removing ionic species from a 50% ethylene glycol aqueous solution, maintaining low conductivity in the heat transfer fluid solution and providing color to the solution.

The invention claimed is:

1. A heat transfer system, comprising
a circulation loop defining a flow path for a colored heat transfer fluid having a conductivity of less than 10 µS/cm, and
an ion exchange resin positioned in the flow path, the ion exchange resin comprising at least 15% by total number of the exchangeable groups comprising a colorant, based on the total number of the exchangeable groups,
wherein the colorant is of the formula:

$$R\{A_k[(B)_nR^1]_m\}_x$$

wherein
R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more C-C double bonds, or combinations thereof;
A is a linking moiety in said chromophore and is selected from the group consisting of O, N or S;
k is 0 or 1;
B is selected from the group consisting of one or more alkyleneoxy or alkoxy groups containing from 1 to 8 carbon atoms;
n is an interger of from 1 to 100;
m is 1 or 2;
x is an integer of from 1 to 5; and
$R^1$ is selected from the group consisting of H, $C_1$-$C_6$ alkyl or alkoxy groups containing from 1 to 8 carbon atoms, or combinations thereof.

2. The heat transfer system of claim 1, wherein the colored heat transfer fluid comprises a non-conductive colorant and has a conductivity of no more than or equal to 10 µS/cm.

3. The heat transfer system of claim 2, wherein the colored heat transfer fluid has a conductivity of less than 5 µS/cm.

4. The heat transfer system of claim 3, wherein the colored heat transfer fluid has a conductivity from 0.02 to 5 µS/cm.

5. The heat transfer system of claim 4, wherein the colored heat transfer fluid has a conductivity from 0.05 to 1 µS/cm.

6. The heat transfer system of claim 2, wherein the non-conductive colorant is present in an amount of from 0.0001 to 0.2% by weight, based on the total weight of the colored heat transfer fluid.

7. The heat transfer system of claim 6, wherein the non-conductive colorant is present in an amount of from 0.0005 to 0.1% by weight, based on the total weight of the colored heat transfer fluid.

8. The heat transfer system of claim 7 wherein the non-conductive colorant is present in an amount of from 0.0005 to 0.05% by weight, based on the total weight of the colored heat transfer fluid.

9. The heat transfer system of claim 8 wherein the colored heat transfer fluid further comprises an alcohol.

10. The heat transfer system of claim 9 wherein the alcohol is at least one of methanol, ethanol, propanol, butanol, furfurol, ethylene glycol, diethylene glycol, triethylene glycol, 1,2-propylene glycol, 1,3-propylene glycol, dipropylene glycol, butylene glycol, glycrol, monoethylether of glycerol, dimethyl ether of glycerol, 1,2,6-hexanetriol, trimethylolpropane, methoxyethanol, or a combination thereof.

11. The heat transfer system of claim 9 wherein the colorant in the ion exchange resin and the non-conductive colorant in the colored heat transfer fluid are the same.

12. The heat transfer system of claim 11 wherein the colorant is substantially free of functional groups that will form an ionic species due to hydrolysis in an aqueous alcohol solution.

13. The heat transfer system of claim 12 wherein the colorant is substantially free of functional groups selected from the group consisting of carboxylate groups, sulfonate groups, phosphonate groups, quaternary amines, groups that carry a positive charge, or groups that carry a negative charge.

14. The heat transfer system of claim 11 wherein the colorant comprises at least one of the following chromophores: anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more conjugated C-C double bond, or combinations thereof.

15. The heat transfer system of claim 14 wherein the colorant comprises the reaction product of a chromophore and a non-conductive alkoxy compound comprising from 1 to 30 carbons.

16. The heat transfer system of claim 15 wherein the colorant comprises the reaction product of at least one chromophore selected from the group consisting of anthraquinone, triphenylmethane, diphenylmethane, azo containing compounds, disazo containing compounds, trisazo containing compounds, diazo containing compounds, or combinations thereof.

17. A fuel cell system, comprising
at least one fuel cell comprising an anode, a cathode, and an electrolyte; and
a fuel cell heat transfer system in thermal communication with the at least one fuel cell, comprising
a circulation loop defining a flow path for a colored liquid heat transfer fluid having a conductivity of less than 10 µS/cm, and
an ion exchange resin positioned in the flow path, the ion exchange resin comprising ion exchangeable groups, wherein at least 15% of the total ion exchangeable groups comprise a colorant
wherein the colorant is of the formula:

$$R\{A_k[(B)_nR^1]_m\}_x$$

wherein
R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more C-C double bonds, or combinations thereof;
A is a linking moiety in said chromophore and is selected from the group consisting of O, N or S;
k is 0 or 1;

B is selected from the group consisting of one or more alkyleneoxy or alkoxy groups containing from 1 to 8 carbon atoms;

n is an interger of from 1 to 100;

m is 1 or 2;

x is an integer of from 1 to 5; and $R^1$ is selected from the group consisting of H, $C_1$-$C_6$ alkyl or alkoxy groups containing from 1 to 8 carbon atoms, or combinations thereof.

18. A method of maintaining a conductivity of less than 10 μS/cm in a colored heat transfer fluid, comprising passing a colored heat transfer fluid through a heat transfer system, wherein the colored heat transfer fluid has a conductivity of less than 10 μS/cm and the heat transfer system comprises a circulation loop defining a flow path for the colored heat transfer fluid, and an ion exchange resin positioned in the flow path, the ion exchange resin comprising at least 15% by total number of exchangeable groups comprising a colorant, based on the total number of exchangeable groups wherein the colorant is of the formula:

$$R\{A_k[(B)_n R^1]_m\}_x$$

wherein

R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more C-C double bonds, or combinations thereof;

A is a linking moiety in said chromophore and is selected from the group consisting of O, N or S;

k is 0 or 1;

B is selected from the group consisting of one or more alkyleneoxy or alkoxy groups containing from 1 to 8 carbon atoms;

n is an interger of from 1 to 100;

m is 1 or 2;

x is an integer of from 1 to 5; and $R^1$ is selected from the group consisting of H, $C_1$-$C_6$ alkyl or alkoxy groups containing from 1 to 8 carbon atoms, or combinations thereof.

19. The method of claim 18 wherein the colored heat transfer fluid has a color that is visible to the human eye.

20. A method of making a colorant treated ion exchange resin, comprising contacting an ion exchange resin with an aqueous colorant solution for a period of time sufficient to exchange at least 15% of the exchange sites with colorant wherein the colorant is of the formula:

$$R\{A_k[(B)_n R^1]_m\}_x$$

wherein

R is an organic chromophore selected from the group consisting of anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups, one or more C-C double bonds, or combinations thereof;

A is a linking moiety in said chromophore and is selected from the group consisting of O, N or S;

k is 0 or 1;

B is selected from the group consisting of one or more alkyleneoxy or alkoxy groups containing from 1 to 8 carbon atoms;

n is an interger of from 1 to 100;

m is 1 or 2;

x is an integer of from 1 to 5; and $R^1$ is selected from the group consisting of H, $C_1$-$C_6$ alkyl or alkoxy groups containing from 1 to 8 carbon atoms, or combinations thereof.

* * * * *